July 24, 1962  A. W. GELLERT  3,046,452
ENCAPSULATED COMPONENT ASSEMBLY
Filed Feb. 5, 1959

INVENTOR.
ALVIN W. GELLERT
BY
AGENT

United States Patent Office 3,046,452
Patented July 24, 1962

3,046,452
ENCAPSULATED COMPONENT ASSEMBLY
Alvin W. Gellert, Phoenixville, Pa., assignor to Burroughs Corporation, Detroit, Mich., a corporation of Michigan
Filed Feb. 5, 1959, Ser. No. 791,332
11 Claims. (Cl. 317—101)

This invention relates to encapsulated component assemblies and more particularly to improvements in their construction.

An object of the invention is to provide such an assembly affording greatly simplified fabrication procedure wherein a reduction in fabrication costs is made in both materials and labor.

A further object of the present invention is to provide a component assembly minimizing component damage due to breakage while assembling or handling.

A still further object of the present invention is to provide a novel component assembly preventing the loss of contact between the component leads and the terminal pins within the assembly due to heat being radiated from soldering equipment when the assembly is connected to circuit boards.

In carrying out the above and other objects of the invention, and first briefly described, the invention comprises a component assembly including a pair of sleeves, press-fitted telescopically one into the other, each being provided with a plurality of mating semi-circular slots forming parallel aligned apertures through the walls of said sleeve assembly from one end to the other, and in which wire terminal pins are disposed. One or more components, such as a magnetic core, is housed within the sleeve assembly with its lead wires fastened to inwardly bent terminal ends of the pins. A plastic material fills the sleeve assembly from one end to the other thus to completely anchor and enclose the components therein.

Various other objects, advantages and features of the invention will become apparent from the following specification, appended claims and drawings, wherein:

Figure 4:
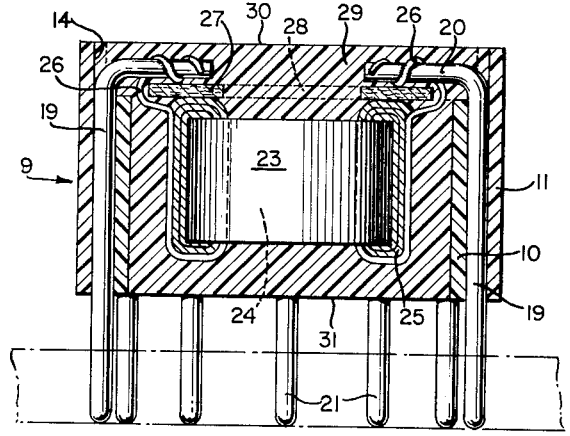
FIG. 4 is a half sectional view of the completed assembly.
Figure 2:
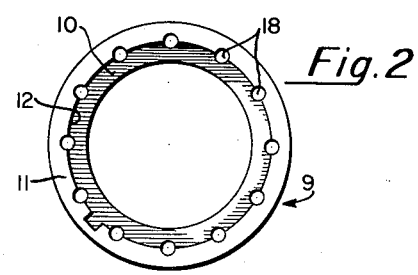
FIG. 2 is a plan view of the assembled sleeve housing.
Figure 3:
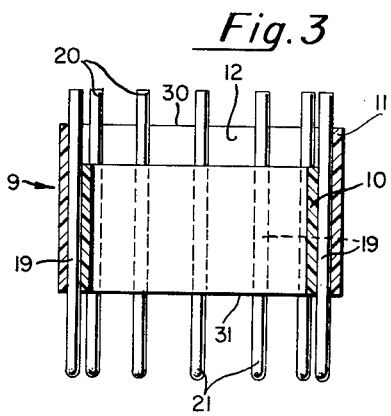
FIG. 3 is a sectional view of the sleeve housing with terminal pins therein.

The features of the invention will best be understood by describing the preferred form of the invention in terms of its fabrication. To this end and first with reference to FIGS. 1 and 2, it is seen that the assembly includes a housing 9 consisting of internal and external cylindrical sleeves 10 and 11, of non-conducting, non-magnetic material, with internal sleeve 10, the shorter of the two, being press fitted into the aperture 12 of external sleeve 11, with the bottom ends of the sleeves, as seen in FIGS. 3 and 4, flush with each other, and the upper end of the inner sleeve recessed within the outer sleeve.

Circularly disposed around the outer periphery of the inner sleeve 10 is a plurality of semicircular slots 13—twelve in this embodiment—whose axes are parallel with the axis of the housing 9. In the same manner, wall 12 of sleeve 11 has the same number of similar slots 14, which are aligned with slots 13 as will hereinafter be described.

To orient slots 13 in sleeve 10 in axial alignment with slots 14 of sleeve 11, an indexing tongue 15 projects outwardly from the surface 16 of sleeve 10 to be slidably received in a mating groove 17 in wall 12 of sleeve 11. When slots 13 and 14 of sleeves 10 and 11 are properly aligned, they form circular holes 18 (FIG. 2) in which wire terminal pins 19 are press fitted, allowing the opposite ends 20 and 21 of the pins to project from opposite ends of the sleeve housing 9 (FIG. 3). It can now be seen that pins 19 are substantially immovably held in position in the assembly. A component, such as core 23 having a central hole 24 and core windings 25, is positioned within housing 9. Each lead wire 26 from windings 25 is connected to the protruding end portion 20 of a predetermined terminal pin 19 and then the ends are dip soldered to assure permanent electrical connection between the two elements.

To insulate and protect the core from the terminal pins, and form a seat for the core as will hereinafter be explained, a disc 27 having a centrally located hole 28 is provided. The disc is made of non-conducting, non-magnetic material, such as composition fibre, and while it may be otherwise formed, in this embodiment is preferably circular in form, with its outer diameter slightly smaller than that of the inside diameter of sleeve 10.

In assembly the disc is positioned on the component lead wires 26, after which the upper extended portions 20 of pins 19 with their connected leads 26 are bent inwardly, radially, arresting the disc 27 between component 23 and the bent end portions of the pins, with lead wires 26 extending around the peripheral edge of the disc.

The entire assembly is then inverted with the end 30 of the sleeve 11 resting upon a flat surface. The core 23 is now resting on the insulated disc 27, isolated from the terminal pins 19. An encapsulating material 29, such as epoxy resin, is poured into the housing 9, passing through central holes 24 and 28 of core 23 and disc 27 respectively, thereby filling all voids in the housing and anchoring all components in place. The potting compound fills the sleeve assembly up to the level defined by the other end 31 thereof.

Figure 1:
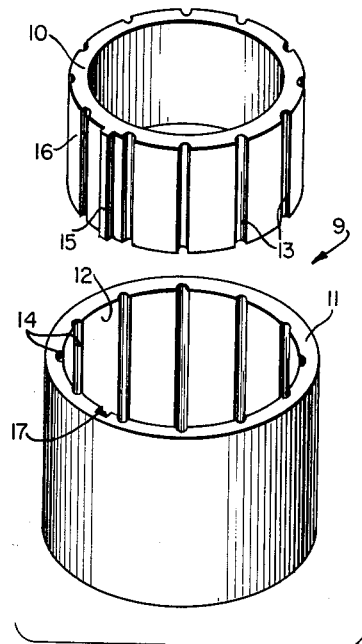
FIG. 1 is an exploded perspective view of the sleeve housing.
Figure 5:
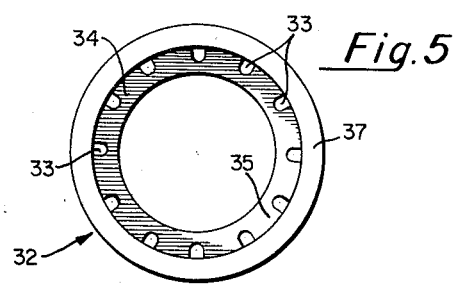
FIG. 5 is a plan view of a modified housing assembly.
Figure 6:
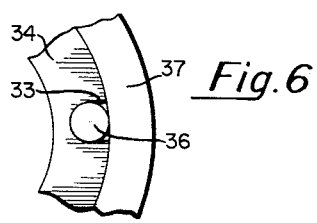
FIG. 6 is an enlarged view of a fragmentary portion of FIG. 5.

FIGURES 5 and 6 illustrate a modification of the invention wherein sleeve housing 32 differs from the sleeve housing 9 of FIG. 1. The major difference in the modification is the use of U-shaped slots 33 in the wall 34 of sleeve 35. Slots 33 are formed deeper into the wall 34 than the semicircular slots 13 in sleeve 10 (FIG. 1), by a 2-to-1 ratio. In this manner, terminal pins 36 will be held firmly in wall 34, with sleeve 37 enclosing the open ends of slots 33. It can be seen that external sleeve 37 differs from sleeve 11 in FIG. 1, in that slots are eliminated in the modified case. Also, the need for an indexing tongue and grove, as shown in FIGS. 1 and 2, is eliminated in the modified form.

From the above description it is apparent that a feature of the invention is that it can be fabricated without the use of special forms, molds or machining. Another feature resides in the terminal pins. With the pin ends bent inwardly, within the sleeve housing, it is virtually impossible for them to be broken loose from their contact with the leads of the component. Heretofore, pins had to be provided with shoulders for retention purposes, which adds to the cost of fabrication. Another feature of the invention is that the two sleeves may easily be fabricated by extrusion, which allows complete flexibility in the choice of sleeve length. Also, in prior encapsulating techniques, each package requires the use of a separate casting form for the encapsulation of each assembly, consequently adding to the cost of manufacturing. A further feature of the present invention is the ease with which the terminal pins may be soldered to the component leads. All soldering may be done above the component, whereas in other assemblies this is a difficult task as there is only a short terminal end available for each contact, and therefore connecting the terminals to the component leads must be accomplished around and beneath the component causing occasional breaks and insecure connections or damage to the component. Another feature of the invention is that the internal connections of the component leads to the terminal are made at the maximum distance from the plug-in end, thus reducing to a minimum the heat effect on the assembly during the soldering operation connecting the terminals to a circuit board.

Thus it is seen that the invention provides a novel component assembly having a number of features not found in known assemblies of this general type.

I claim:

1. A component assembly comprising: a tubular housing, said housing comprising an external sleeve and an internal sleeve telescoped together and cooperating to form a plurality of apertures through the wall of said housing from one end thereof to the other end; terminal pins press fitted in said apertures, thus to secure them firmly to the housing with the ends of said pins at one end of said housing extending from said housing to form means for connection of said assembly to associated apparatus, the pin ends at thes other end of said housing being bent inwardly toward the center of and within said housing; an electrical component within said housing, said component having lead wires connected to the bent ends of said pins; and an insulating potting compound filling said housing, thus to encapsulate said component.

2. A component assembly comprising: a tubular housing, said housing comprising an external sleeve and an internal sleeve telescoped together and cooperating to form a plurality of apertures through the wall of said housing from one end thereof to the other end, said inner sleeve being shorter than said outer sleeve to provide a recessed ledge at one end of said housing; terminal pins press fitted in said apertures, thus to secure them firmly to the housing with the ends of said pins at one end of said housing extending from said housing to form means for connection of said assembly to associated apparatus, the pin ends at the recessed end of said housing being bent inwardly over said ledge toward the center of and within said housing; an electrical component within said housing, said component having lead wires connected to the bent ends of said pins; and an insulating potting compound filling said housing, thus to encapsulate said component.

3. A component assembly comprising: a tubular housing, said housing comprising an external sleeve and an internal sleeve telescoped together and cooperating to form a plurality of apertures through the wall of said housing from one end thereof to the other end, said inner sleeve being shorter than said outer sleeve to provide a recessed ledge at one end of said housing; terminal pins press fitted in said apertures, thus to secure them firmly to the housing with the ends of said pins at one end of said housing extending from said housing to form means for connection of said assembly to associated apparatus, the pin ends at the other recessed end of said housing being bent inwardly over said ledge toward the center of and within said housing; an electrical component within said housing, means insulating said component from said pins; said component having lead wires connected to the bent ends of said pins; and an insulating potting compound filling said housing, thus to encapsulate said component.

4. A component assembly comprising: a housing, said housing comprising an external sleeve having a plurality of slots formed in its inner surface, and an internal sleeve having a plurality of slots formed in its outer surface and mating with said slots in said outer sleeve to form apertures through the wall of said housing from one end thereof to the other, said inner sleeve being shorter than said outer sleeve to provide a recessed ledge at one end of said housing; terminal pins press fitted into said apertures, thus to secure them firmly to the housing with the ends of said pins at one end of said housing extending from said housing to form means for connection of said assembly to associated apparatus, the pin ends at the recessed end of said housing being bent inwardly over said ledge toward the center of said housing; an electrical component within said housing, said component having lead wires connected to the bent ends of said pins; and an insulating potting compound filling said housing.

5. A component assembly comprising: a housing, said housing comprising an external sleeve having a plurality of slots formed in its inner surface, and an internal sleeve having a plurality of slots formed in its outer surface, and mating with said slots in said outer sleeve to form apertures through the wall of said housing from one end thereof to the other, said inner sleeve being shorter than said outer sleeve to provide a recessed ledge at one end of said housing; terminal pins press fitted into said apertures, thus to secure them firmly to the housing with the ends of said pins at one end of said housing extending from said housing to form means for connection of said assembly to associated apparatus, the pin ends at the recessed end of said housing being bent inwardly over said ledge toward the center of said housing; an electrical component within said housing; means insulating said component from said pins; said component having lead wires connected to the bent ends of said pins; and an insulating potting compound filling said housing.

6. An assembly according to claim 5 wherein said insulating means comprises a disc shaped member having a central aperture.

7. A component assembly comprising: a housing, said housing comprising an external cylindrical sleeve having a plurality of substantially semi-circular slots formed in spaced relation with each other about its inner surface, and an internal cylindrical sleeve having a plurality of slots formed in spaced relation with each other about its outer surface and mating with said slots in said outer sleeve to form apertures through the wall of said housing substantially parallel with the axis of said sleeves, said inner sleeve being shorter than said outer sleeve to provide a recessed ledge at one end of said housing; terminal pins press fitted in said apertures, thus to secure them firmly to the housing with the ends of said pins at one end of said housing extending from said housing to form means for connection of said assembly to associated apparatus, the pin ends at the recessed end of said housing being bent inwardly over said ledge toward the axis of said housing; an electrical component within said housing; means insulating said component from said pins; said component having lead wires connected to the bent ends of said pins; and an insulating potting compound filling said housing.

8. An assembly according to claim 7 wherein said component is a magnetic core having windings therearound, and said housing, said insulating means, and said potting compound are of non-magnetic, non-conductive materials.

9. A component assembly comprising: a housing, said housing comprising an external sleeve having a plurality of slots formed in its inner surface, and an internal sleeve having a plurality of slots formed in its outer surface, said internal sleeve being telescope within said external sleeve, and means for bringing said slots into mating relationship during assembly of said sleeves, thus forming apertures through the wall of said housing from one end thereof to the other, said inner sleeve being shorter than said outer sleeve to provide a recessed ledge at one end of said housing; terminal pins press fitted into said apertures thus to secure them firmly to the housing with the ends of said pins at one end of said housing extending from said housing to form means for connection of said assembly to associated apparatus, the pin ends at the recessed end of said housing being bent inwardly over said ledge toward the center of said housing; an electrical component within said housing; means insulating said component from said pins; said component having lead wires connected to the bent ends of said pins; and an insulating potting compound filling said housing.

10. An assembly according to claim 9 wherein said mating means comprises a longitudinally extending groove provided in a surface of one of said sleeves and a longitudinally extending tongue on a surface of the other sleeve.

11. A component assembly comprising: a housing, said housing comprising an external sleeve, and an internal sleeve having a plurality of slots formed in its outer surface from one end thereof to the other, said inner sleeve cooperating with said outer sleeve to form apertures through the wall of said housing, said inner sleeve being shorter than said outer sleeve to provide a recessed ledge at one end of said housing; terminal pins press fitted into said apertures, thus to secure them firmly to the housing with the ends of said pins at one end of said housing extending from said housing to form means for connection of said assembly to associated apparatus, the pin ends at the recessed end of said housing being bent inwardly over said ledge toward the center of said housing; an electrical component within said housing; means insulating said component from said pins; said component having lead wires connected to the bent ends of said pins; and an insulating potting compound filling said housing.

References Cited in the file of this patent

UNITED STATES PATENTS

| | | |
|---|---|---|
| 2,724,095 | Rudner | Nov. 5, 1955 |
| 2,829,426 | Franklin | Apr. 8, 1958 |
| 2,836,805 | Goldsmith | May 27, 1958 |
| 2,862,992 | Franz | Dec. 2, 1958 |
| 2,889,524 | Schmitz | June 2, 1959 |
| 2,897,420 | Butt | July 28, 1959 |
| 2,899,631 | Cushman | Aug. 11, 1959 |
| 2,918,640 | Higgs | Dec. 22, 1959 |
| 2,953,758 | Stanwyck | Sept. 20, 1960 |